(12) United States Patent
Scott

(10) Patent No.: US 7,973,420 B2
(45) Date of Patent: Jul. 5, 2011

(54) ENERGY STORAGE

(75) Inventor: Tom Scott, Bloomfield Hills, MI (US)

(73) Assignee: ViewTek2 LLC, Bloomfield Hills, MI (US)

( * ) Notice: Subject to any disclaimer, the term of this patent is extended or adjusted under 35 U.S.C. 154(b) by 193 days.

(21) Appl. No.: 12/386,865

(22) Filed: Apr. 25, 2009

(65) Prior Publication Data

US 2009/0284021 A1    Nov. 19, 2009

Related U.S. Application Data

(60) Provisional application No. 61/125,588, filed on Apr. 26, 2008, provisional application No. 61/208,409, filed on Feb. 24, 2009.

(51) Int. Cl.
*H20K 17/02* (2006.01)

(52) U.S. Cl. ............. 290/1 R; 290/44; 290/45; 290/1 A; 290/55

(58) Field of Classification Search .................. 290/1 R, 290/43, 44, 55
See application file for complete search history.

(56) References Cited

U.S. PATENT DOCUMENTS

| | | | |
|---|---|---|---|
| 680,038 A | 8/1901 | Gore | |
| 4,380,419 A | 4/1983 | Morton | |
| 6,023,105 A | 2/2000 | Youssef | |
| 6,160,336 A | 12/2000 | Baker et al. | |
| 7,770,394 B2 * | 8/2010 | Beck | 60/670 |
| 7,821,144 B2 * | 10/2010 | Frayne | 290/1 R |
| 7,834,471 B2 * | 11/2010 | Cripps | 290/1 E |
| 7,847,421 B2 * | 12/2010 | Gardner et al. | 290/1 R |
| 7,872,361 B2 * | 1/2011 | McFadden | 290/1 R |
| 2008/0217924 A1 | 9/2008 | Boone | |

FOREIGN PATENT DOCUMENTS

| | | |
|---|---|---|
| FR | 2852063 | 10/2004 |
| JP | 2004218436 | 5/2004 |

* cited by examiner

*Primary Examiner* — T C Patel
*Assistant Examiner* — Iraj A Mohandesi
(74) *Attorney, Agent, or Firm* — Brooks Kushman P.C.

(57) ABSTRACT

Several embodiments are disclosed that enhance and improve the efficiencies of alternative electrical generating sources by converting electrical energy to potential energy through electro-mechanical means. The embodiments provide gravitational energy storage by lifting masses from lower to higher elevations during desired periods, such as when the generating sources are producing excess energy or when electrical rates are the least expensive. Energy storage is maintained until such time as it is need and then converted from potential mechanical energy to electricity by gravitational forces. By storing energy, one can supplement and enhance the efficiencies of producing electricity by alternative means such as wind and solar by expanding the times when electricity is available. Additionally, one can time-shift the purchase and use of commercial power by buying power to store energy when rates are low and using the stored energy when rates are high.

12 Claims, 6 Drawing Sheets

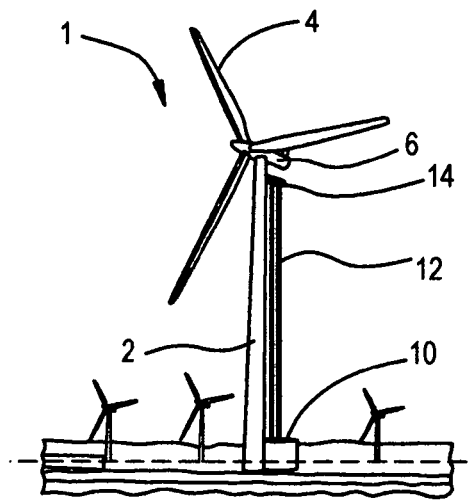
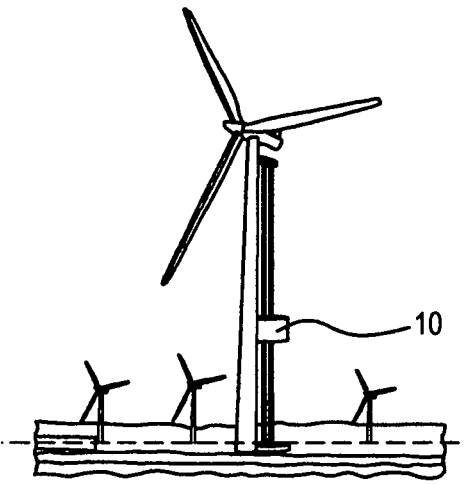
FIG. 1     FIG. 2
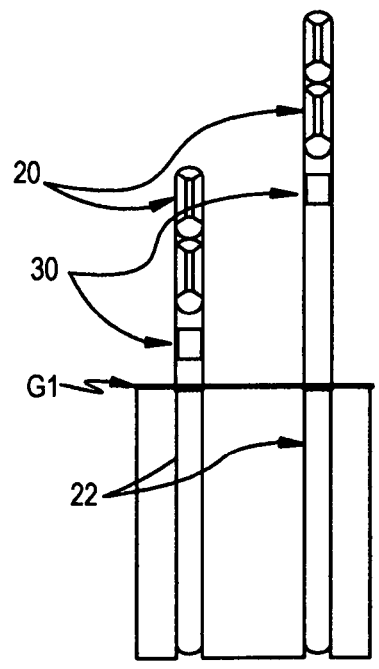
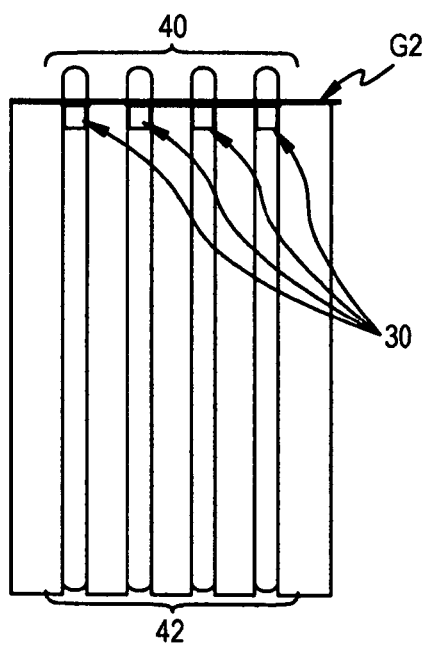
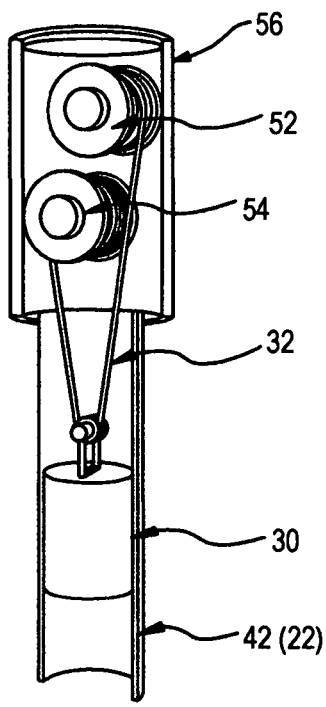
FIG. 3     FIG. 4     FIG. 5

ENERGY STORAGE

RELATED APPLICATION

This application claims benefit of U.S. provisional application Ser. No. 61/125,588 filed Apr. 26, 2008 and U.S. provisional application Ser. No. 61/208,409 filed Feb. 24, 2009.

BACKGROUND

1. Field of the Invention

The invention is directed to the field of making more efficient use of non-continuous alternative energy sources such as solar collectors and wind turbine generators, as well as taking advantage of conventional electrical energy sources during times of low demand when such energy is available (provided) at a lower cost, by utilizing improved energy storage techniques that are suitable for universal implementation.

2. Description of the Prior Art

Although wind can be found everywhere on the planet, and is always blowing somewhere, it is erratic. It is erratic as to where it blows, when it blows, at what speed it blows, the length of time it blows and what kind of wind it is . . . steady, gusting, changing direction . . . or all at the same time. This erratic factor is often overlooked when manufacturers and governments claim energy efficiencies from wind turbines. Similarly, solar collectors are dependent on a steady supply of exposure to solar radiation. Solar energy is the most inconsistent due to night and clouds.

Techniques for enhancing the efficiencies of these alternative and inconsistent energy sources can involve the conversion of electricity to a form of potential energy and storing that energy until it is need to be converted to electrical energy. Electricity, produced during periods of high output and low demand, can be time-shifted through energy storage so that the energy is available when the demand exceeds the output of the alternative sources. Batteries are the most common form of energy storage. However, they are expensive to acquire and maintain, and involve risks of environmental damage. Other techniques have been disclosed that involve the pumping of water to an existing reservoir for later release to drive turbines for electrical power generation. While this is suitable for large energy needs, it requires a ready and large supply of water for implementation. The enormous up front, capital costs and potentially adverse environmental impacts preclude the building of new reservoirs for these purposes. Techniques for storing air and liquids under pressure for later release have been disclosed. Such techniques are usually limited to small installations used to drive a motor or pump for a limited time and application. Each of these prior art energy storage techniques have their advantages and limitations depending on the availability of water, varying elevations, and availability of technical service for frequent maintenance.

SUMMARY OF THE INVENTION

In the present invention, several embodiments are presented in which facilities contain large masses (weights) that are electro/mechanically raised from their lowest levels to maximum heights against the force of gravity and locked in place to store potential energy. Electrically responsive motors are used to produce work on the large masses to move them from a position of low potential energy to a position of higher potential energy. Later, when electrical energy is desired to be obtained from the storage facility, the weights are controllably dropped to lower levels by gravitational forces. During the drops, the weights are connected to drive electrical generators and electrical energy is produced. By scaling up the invention one can produce sufficient electricity to power the electrical needs of factories, multi-storied high rise buildings and small villages during periods of emergencies, black-outs, or at times when energy rates are at their highest.

In a first embodiment, an electric motor is connected to the output of a wind turbine generator and is geared or similarly mechanically connected to lift a large mass (weight) alongside the mast pylon that supports the turbine. This usually occurs during times when there is low demand for the wind turbine generator output. During such times, the electric motor is engaged and the weight is raised from a low height towards the maximum height allowed by the embodiment.

A second embodiment of energy storage utilizes a single or series of masses to be raised and lowered inside the tubular mast supporting an associated wind turbine.

A third embodiment of energy storage utilizes a small grouping of cylindrical storage tubes having their central axes aligned along the vertical. Each storage tube contains movable masses. These tubes can be separate from a renewable or non-renewable electrical source such as wind turbine, or utility, but can be controlled individually or as a group to store energy and generate electricity at a later time.

A fourth embodiment of energy storage utilizes an array of vertically oriented storage tubes which each contain one or more movable masses.

A fifth embodiment of energy storage utilizes open cores of a high rise building to contain movable masses. This embodiment is suitable for use in association with wind turbines that are integrated within the building.

Other embodiments of energy storage involve various common mass storage facilities that utilize several electric motors connected to lift several large masses against the force of gravity and store those masses in positions of higher potential energy until such later time that their potential energy is required to be converted to electrical energy. At such later time, the masses are allowed to be lowered by gravity and an associated generator is mechanically driven to produce electricity for the desired load. To be viable on a large scale a "flow through" system is necessary to handle the varying input, storage and generating demands which change minute by minute, hour by hour, etc to meet the demands of Utility companies and industrial and commercial customers.

It is one object of the present invention to provide a relatively low cost and reliable energy storage system and method that can be used to supplement the high cost of electrical power during peak demand times.

It is another object of the present invention to provide a relatively low cost and reliable energy storage system and method to supplement the output of alternative and/or on-site power generation sources during times when they cannot produce electricity.

It is a further object of the present invention to provide an energy storage and delivery system and method that assists in load balancing distribution networks to allow alternative energy sources from solar and wind energy "schedulable".

BRIEF DESCRIPTION OF THE DRAWINGS

FIG. 1 is an elevational view of a typical and conventional 3-bladed wind turbine generator containing the first embodiment of the invention shown in a first stage of no gravitational energy storage with the liftable mass at its lowest level.

FIG. 2 is an elevational view of a wind turbine generator shown in FIG. 1 shown in a second stage of gravitational energy storage the liftable mass at an intermediate level where is provides a measure of potential energy for later release.

FIG. 3 illustrates vertical avis type wind turbine generators associated with integral energy storage devices of the present invention.

FIG. 4 illustrates the concept of utilizing a small group of individual tubular towers to store energy produced by associated but remote wind turbine generators or other sources.

FIG. 5 illustrates the concept of employing an electric motor to raise a mass and a generator being gravity driven during the lowering of the mass within a storage tube.

DETAILED DESCRIPTION OF THE EMBODIMENTS

Figure 6:
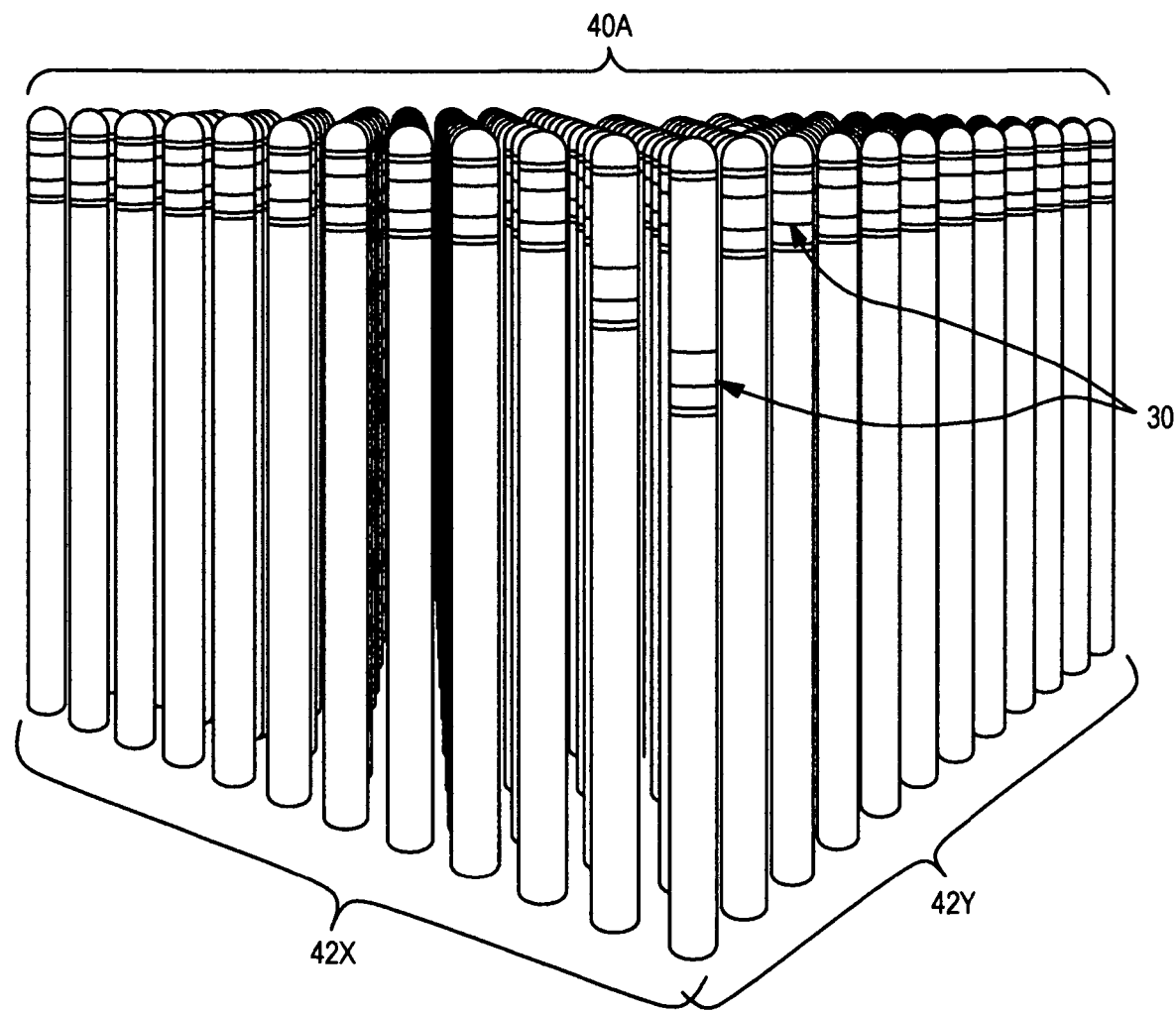
FIG. 6 illustrates the efficiency of employing a large array of closely spaced storage tubes such as those shown in FIG. 5.

Energy storage is of primary importance in increasing the efficiency and scheduling of alternative sourced electrical power. While commercial utility power plants provide substantially continuous base load energy during extended periods of weeks and months, most alternative energy systems that use solar or wind power are inherently intermittent because of variations in the input energy (night, clouds and wind speeds outside the operational window). At night, when energy requirements are relatively low, the produced but unused energy is effectively "wasted". Although alternative energy sources are inherently intermittent and therefore somewhat inefficient, there is a vast market available for otherwise wasted energy, provided practical storage and conversion to electricity is available for use at alternative times. The present invention provides a means for taking advantage of this potential market and opening up opportunities for both suppliers and users of electrical energy. For suppliers, it provides a means for off-loading or decreasing demand during periods of normally high demand with the potential result of reducing the frequency to add or replace generating equipment. It also allows suppliers to sell more energy during traditionally low demand periods (night time) at competitive rates and allows for better balancing of the grid. For the user, it provides a means of time-shifting the times it purchases electricity from the grid and to save significant amounts of money by purchasing at competitive rates during such low demand times, and then using the stored energy during times when rates and demand are highest. By combining the storage techniques of the present invention with auxiliary power sources, users can significantly reduced their electrical power costs.

The first embodiment is shown in FIGS. 1 and 2, wherein a wind turbine generator 1 is shown with a vertical support pylon 2 and a conventional set of three blades 4 connected to an electrical generator unit 6. A large mass 10, such as concrete or lead is secured to lifting cables 12 which are suspended from a support beam 14. Electric motors (not shown) are mechanically connected to the lifting cables to provide work energy to the mass 10 against the force of gravity. The electric motors are connected to receive electrical energy from the output of the generator unit 6 when demand is low and it is determined that excess electricity is being generated that would otherwise be wasted. When such a condition exists, the electric motors are energized and cause mass 10 to be lifted by support cables 12 upwards along the pylon 2. This results in the gravitational storage of energy that is maintained until electrical energy is demanded that is greater than the wind turbine generator unit is able to output. When more energy is required, such as when the wind velocities are outside the design window and the electrical distribution grid shows (or owner/user has) a demand, the mass is allowed to be lowered by gravity and through appropriate gearing, drives the generator to produce electricity and thereby increase the usable efficiency of the wind turbine.

A second embodiment is shown in FIG. 3, as an energy storage system incorporated into the hollow support pylon 22 of a vertical axis wind turbine (VAWT) 20. Mass weights 30 are suspended within the support pylon 22 preferably with cables 32 such as are shown in FIG. 5. The VAWTs 20 each include an individual electrical low speed generator 54 below the turbine and the output from the generator 54 can be controlled to energize the lifting motor 52 to lift the mass 30. FIG. 5 illustrates the concept of using an electric motor to lift a large mass higher into the pylon or tube to store it for later use. As in the first embodiment, the mass 30 is moved from a position of relatively low energy potential to positions of higher energy potential. When it is desired to draw on the stored energy, the mass 30 is released under controlled conditions to drive an associated electrical generator 54. In FIG. 3, the grade G1 is shown to give perspective to the installation that would be preferable above and below grade. The mass of the weights and range of lift determine the quantity of potential energy that can be stored.

FIG. 4 shows that a separate group 40 of energy storage tubes 42 may be used to store potential energy. In this case, tubes 42 are mostly below grade G2. Individual tubes 42 each have a motor 52 and generator 54 located in the head 56, as shown in FIG. 5, to control the raising and lowering of weights 30. The group 40 can be associated with one or more auxiliary electrical energy sources such as wind turbines or solar collectors. However, such association is not required in order to store energy. Any source of electrical energy can serve to drive the motors that lift the weights. The group 40 is controlled to store potential energy and release energy in the form of generated electrical power when desired.

FIG. 6 illustrates the concept of FIG. 5 implemented a large group 40A of storage tubes in an array 42X×42Y. As in FIGS. 4 and 5, Individual tubes 42 each have a motor 52 and generator 54 located in the head 56 to control the raising and lowering of weights 30. Each tube performs the same function of mechanically storing energy and providing electrical power at a later time. However, with a great number of storage tubes, it can be seen that there is a potential for storing significant amounts of energy for later use.

Figure 7:
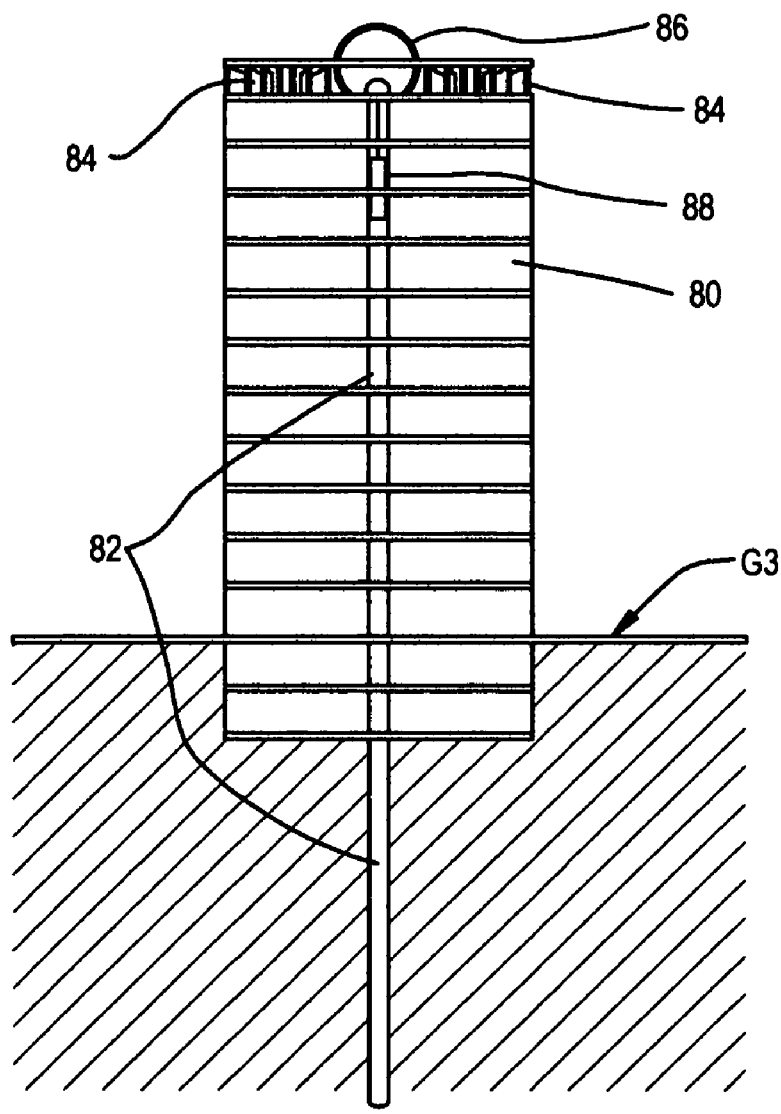
FIG. 7 illustrates the concept of employing a central shaft or open core of a multi-storied high-rise building for energy storage and integrating the storage with building mounted wind turbine generators.

FIG. 7 illustrates the concept of how many high rise buildings 80 contain cores or open shafts 82 that are unused; or, if used, contain significant clear air space. In such cores, the energy storage techniques disclosed herein may be implemented to supplement the production of alternative energy such as from wind turbines 84 integrated on the building 80; emergency power; or as a low cost alternative to commercial utility power by buying energy during times of low power cost alternative to commercial utility power by buying energy during times of low power rates (night) and storing that energy for release at times of high power rates (day). In the case of high rise buildings, the shafts 82 can be many stories high and reach deep into the substructure 81 of the building below grade G3 and the roof can support the central lift mechanism 86 to raise and lower weights 88.

Although not shown, the high rise building embodiment of FIG. 7 can be readily adapted to be employed in abandoned mine shafts located in the vicinity of wind turbine farms. Since some mine shafts extend several thousands of feet below the surface, there is opportunity to store significant amounts of potential energy during times of low demand.

Figure 8:
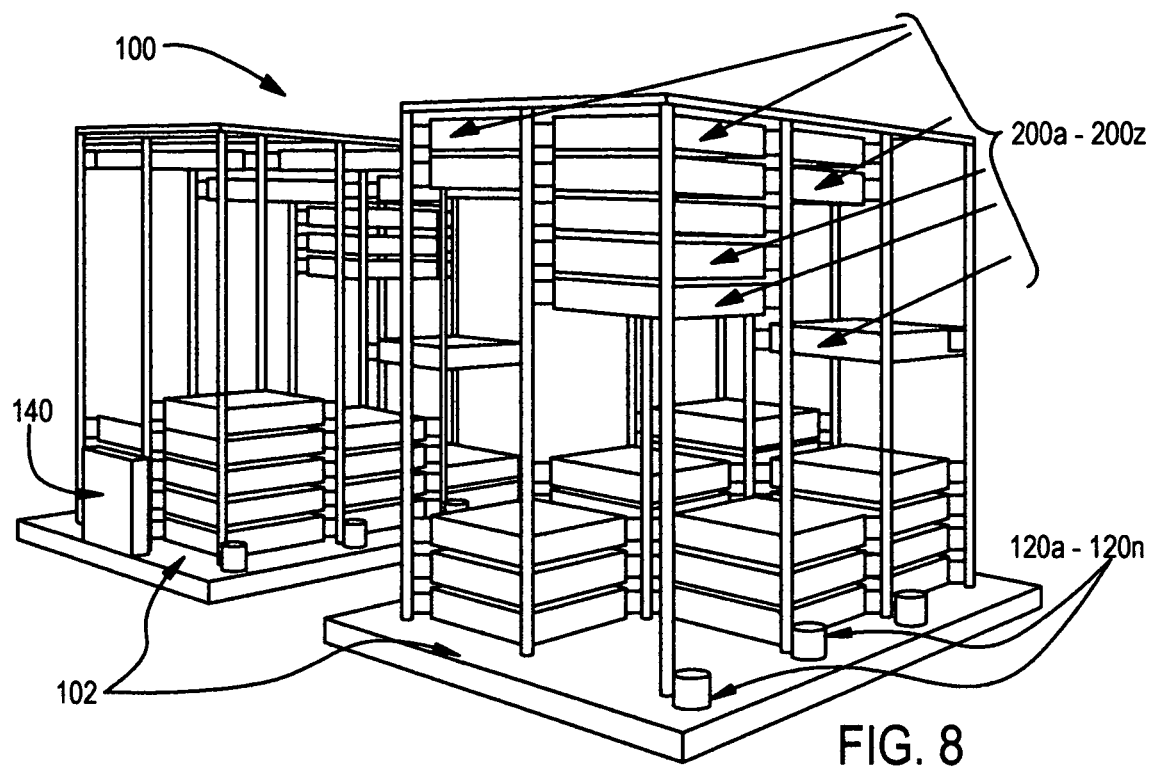
FIG. 8 illustrates the concept of an energy storage facility for a plurality of large mass elements raised to higher levels and for generating electricity when the mass elements are lowered.

FIG. 8 provides an alternative embodiment to the tube structures presented above. In this embodiment, a central gravity storage facility 100 is depicted in which storage racks 102 are provided to store several weights 200a-200z in parallel stacks of mass elements in vertical series. A lifting mechanism is driven by electric motors 120a-120n in response to a control panel 140 to lift each weight to its maximum height. When individually released, the lifting mechanism is driven in an opposite direction that drives an associated electric motor in reverse or drives separate electrical generators (not shown). Since the weights 200 are stacked in vertical series, each lower weight 200 in a single stack has the same potential energy as the ones above it, since they are each raised and lowered the same distance (assuming each weight is equal to the others in the stack). But because the weights 200 are individually controlled, the overall potential energy can be significant. The embodiment shown in FIG. 8 is suitable for buildings such as warehouses, factories and hangars, as well as basements.

Figure 9:
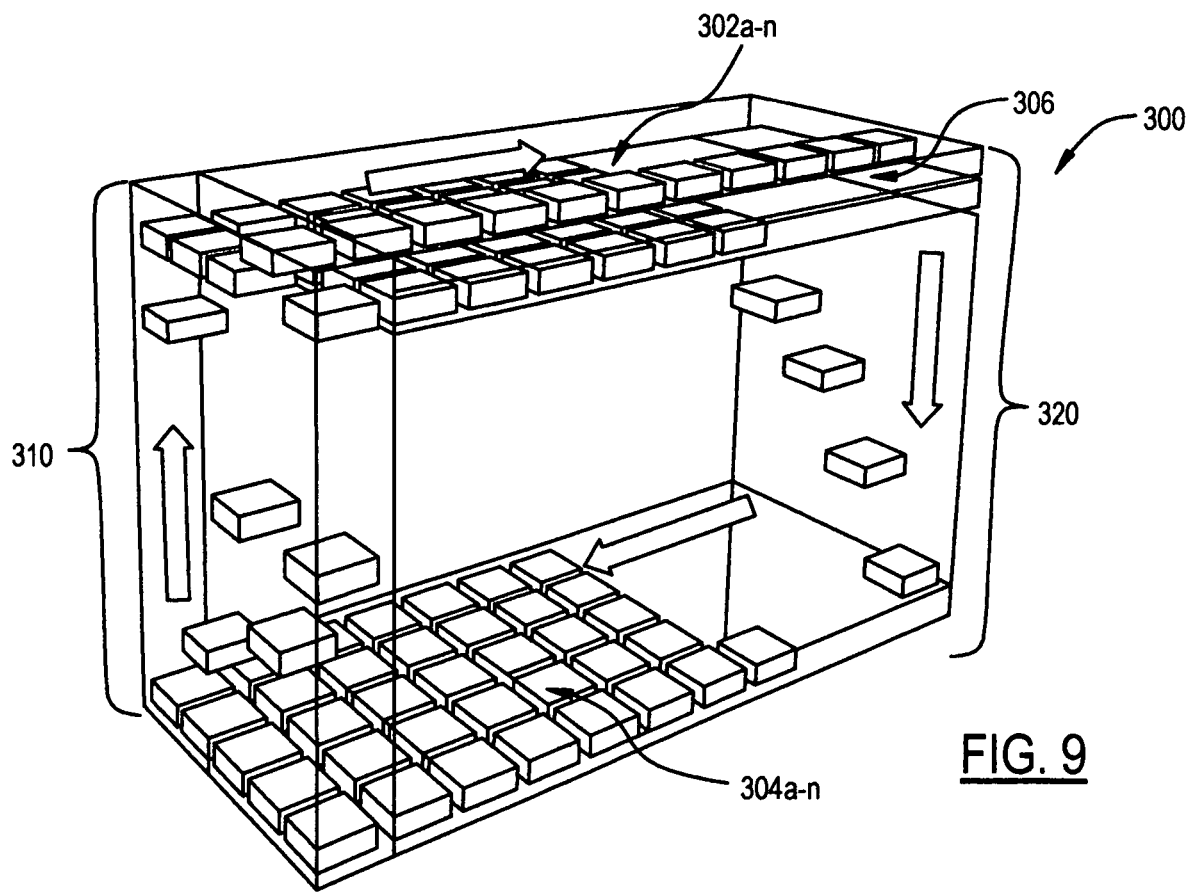
FIG. 9 illustrates the concept of storing large mass elements at varying heights and being able to manipulate the mass weights to a designated drop zone for electricity generation when desired.

Mass handling of weights and storing of potential energy on a large scale is depicted in FIG. 9-12. FIG. 9 illustrates the general handling methods used in the large scale facilities of both above-ground and below-ground installations. The facility 300 is configured to have a lift zone 310 and a drop zone 320. In the lift zone 310, individual mass blocks $204_{a-n}$ are raised from their postions of low until electricity is desired to be withdrawn from the facility 300. The higher potential blocks $302_{a-n}$ are placed on a slanted surface or conveyor to allow them to collect in the opposite end near the drop zone 320. In the drop zone 320, individual platforms are controlled and connect to one or more generators to produce electrical power when the blocks are dropped to the lower level. Electricity from conventional or auxiliary sources is used to raise heavy mass elements, preferably lead blocks (e.g. lead weighs 11,000 kgs per cubic meter), and store them as potential energy. Energy can be stored without losses for seconds, minutes, hours, days or years. When energy is required, the blocks are dropped and the resulting kinetic energy drives the generators to produce electricity.

Figure 10:
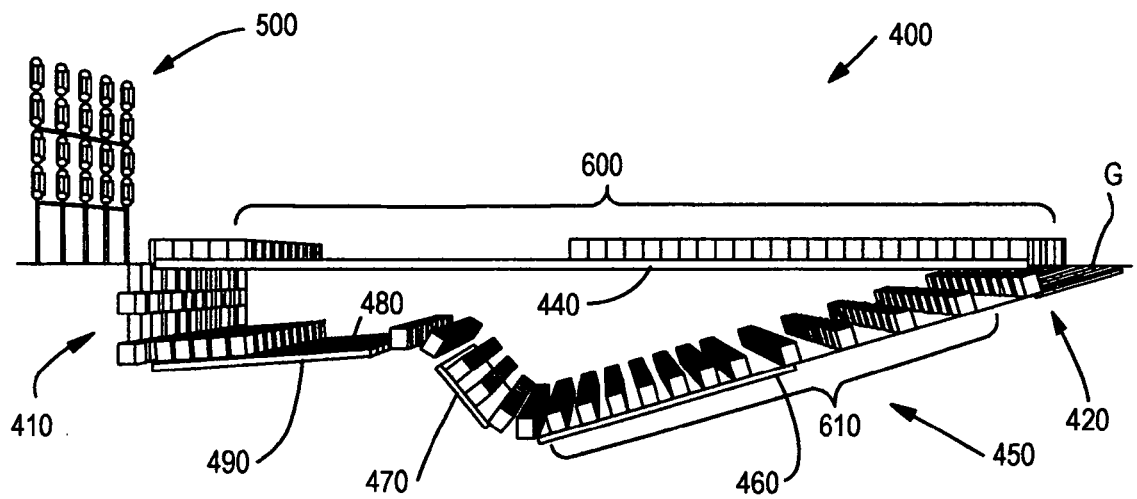
FIG. 10 illustrates a system for both generating electrical power from wind turbine generators and storing energy by raising a large plurality of mass elements from an underground location to an above-ground level and generating electricity when the mass elements are lowered back into the below grade location.
Figure 11:
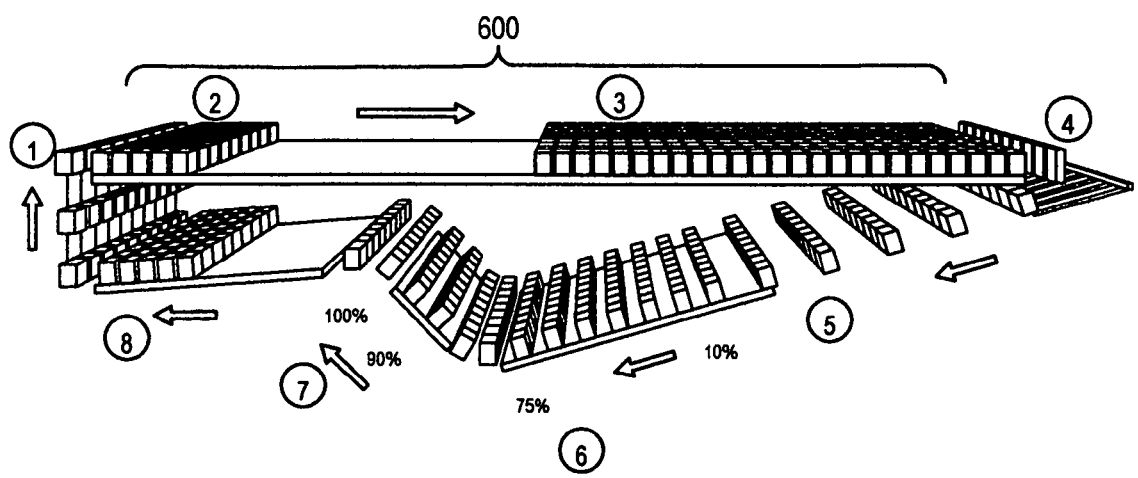
FIG. 11 illustrates the details of operating the underground energy storage system of FIG. 10.

A large version of a facility utilizing the principles shown in FIG. is depicted in FIGS. 10 and 11 as an under-ground mass storage system. In FIG. 10, the system 400 is shown in conjunction with an array of VAWTs 500 to provide the energy needed to operate the storage facility.

As mentioned earlier, many utility companies provide power at much lower rates when demand is less, such as at night. No matter which source of electrical power is employed, the system of FIGS. 10 and 11 is desirable and can provide significant cost savings. Assuming the scenario of buying and storing relatively cheap rate utility energy when it is available; and also supplementing auxiliary energy during times of high utility rates with stored energy helps to understand the advantages of the system shown in FIGS. 10 and 11.

In FIGS. 10 and 11, an underground generation facility 400 is shown in which the storage for the mass elements 600 at higher potential energy is at ground-level "G" or higher, while the lift zones 410 and drop zones 420 are underground. In this facility, the lift zone 410 is at the left end and the drop zone 420 is at the right. Lifting is performed by utilizing cheap or excess electricity to drive electric motors and the blocks 600 are stored at the upper level "G". The blocks 600 are conveyed by low friction horizontal linear conveyor system 440 means to the drop zone 420 as space opens up at the right end. A horizontal belt conveyor 440 with a slope of approximately 1% is used to move the blocks towards the drop zone 420. As electrical energy is demanded to be generated by the storage facility, the upper stored blocks 600 are released at the drop zone 420. An escapement mechanism is controllably used to transfer the blocks 600 to the underground drop and generation section. A sloping floor in the underground section 450 contains conveyor tracks 460 that are connected to one or more generators. As the load of blocks 610 on each track is drawn downward by gravity, the generators keep producing electricity. Near the end of the first section of the conveyor tracks, a slight upward ramp 470 allows the blocks 610 to be raised by the conveyor and momentum of the blocks to a second downward sloping area 480 where they are released from the generator conveyor tracks and allowed to approach the lift zone 410 on a conveyor 490 with an approximately 1% downward slope.

Figure 12:
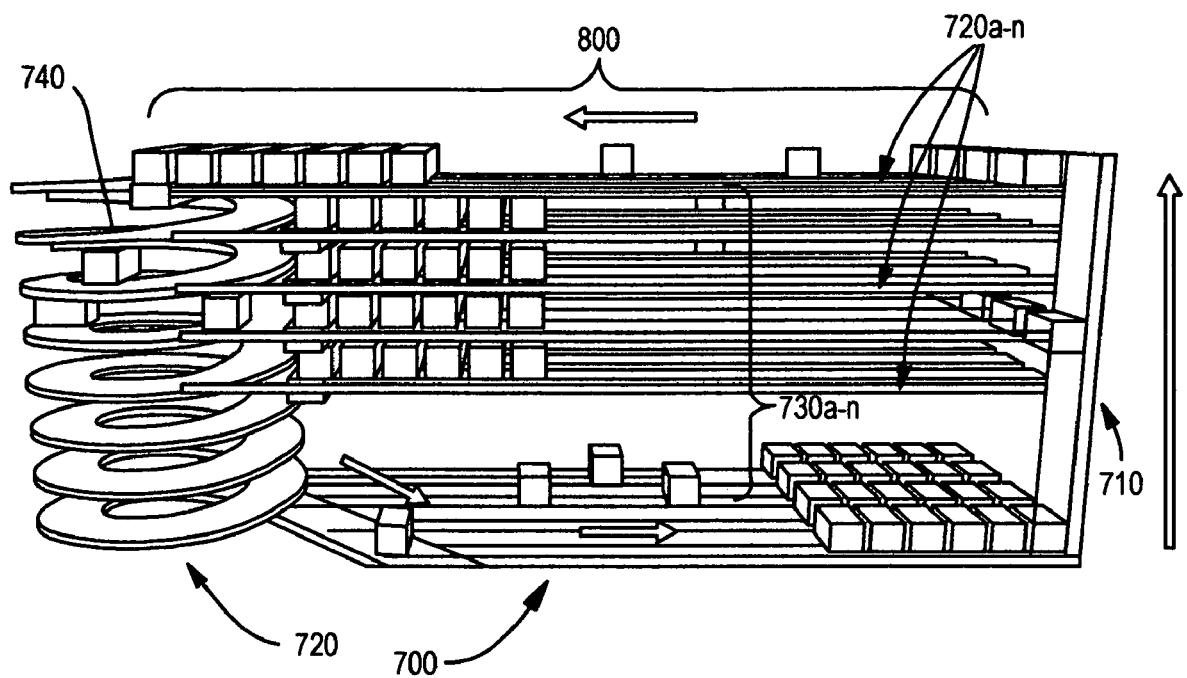
FIG. 12 illustrates another system for storing energy by raising a large plurality of mass elements to higher levels and generating electricity when the mass elements are lowered on a helical conveyor.

FIG. 12 shows another embodiment of a mass energy storage facility 700 that uses several floors 702a-n of high potential storage. In this embodiment, the lift zone 710 is on the right and the drop zone 720 is on the left. Blocks 800 are raised by electric motors to appropriate floors where horizontal linear belt conveyors 730 a-n provide low friction transfer of the blocks along a 1% slope towards the drop zone 720. In order to allow each floor of potential energy storage to drive the energy generators, a helical conveyor 740 is connected to a generator and each floor is able to release blocks through a mechanical escapement mechanism to the helical conveyor 740, as needed. These systems can be scaled up or down to meet the requirements of the electrical customer or user and the inventive concept is not restricted to any size limitation.

It can be seen by the drawings and accompanying explanation, the present invention is a unique improvement over conventional electrical storage techniques and facilities. And while the embodiments shown here are varied they shall not be considered to be a restriction on the scope of the claims set forth below.

I claim:

1. An energy storage and delivery system including:
   at least one mass element;
   a defined volume containing said at least one mass element;
   a source of electrical energy;
   a first electro-mechanical device connected to said source for using electrical energy from said source to raise said mass element from a position of relatively low potential energy to a position of relatively higher potential energy in said defined volume;
   a second electro-mechanical device connected to said mass while it is lowered to a position of lower potential energy;

said second electro-mechanical device generating electricity in response to said lowering of said mass; and a control device for individually operating said first and second devices according to a set of predetermined conditions.

2. An energy storage and delivery system as in claim 1, wherein said source of electrical energy is a wind turbine driven generator mounted on a support pylon and said defined volume is an unobstructed column of space existing adjacent to said pylon.

3. An energy storage and delivery system as in claim 1, wherein source of electrical energy is a wind turbine driven generator mounted on a support pylon and said defined volume is an unobstructed column of space existing within said pylon and containing said at least one mass element.

4. An energy storage and delivery system as in claim 1, wherein said defined volume is a cylindrical tube having its axis disposed along the vertical and containing said at least one mass element.

5. An energy storage and delivery system as in claim 1, wherein said defined volume is a plurality of cylindrical tubes disposed in an array with each of their axes disposed along the vertical and each containing at least one mass element.

6. An energy storage and delivery system as in claim 1, wherein said defined volume is at least one vertical core within a multi-storied building and containing at least one mass element.

7. An energy storage and delivery system as in claim 6, wherein said source of electrical energy is a wind turbine integrated into said building.

8. An energy storage and delivery system as in claim 1, wherein said defined volume is configured to contain several parallel stacks of mass elements in vertical series.

9. An energy storage and delivery system as in claim 1, wherein said defined volume is configured to contain a defined lift zone and a defined drop zone, wherein said lift and drop zones are horizontally spaced from each other;

said first electro-mechanical device raises said at least one mass element from a position of relatively low potential energy to a position of relatively higher potential energy in said defined lift zone of said defined volume; and said system further includes first means for conveying said at least one raised mass element from said lift zone to said defined drop zone while maintaining said at least one mass at said position of higher potential energy.

10. An energy storage and delivery system as in claim 9, wherein said second electro-mechanical device is energized by said at least one mass element entering said drop zone and being released and lowered to a position of lower potential energy.

11. An energy storage and delivery system as in claim 10, wherein said at least one mass element is a plurality of mass elements disposed within said defined volume in individual rows and are individually raised from a position of relatively low potential energy to a position of relatively higher potential energy in said defined lift zone.

12. An energy storage and delivery system as in claim 11, wherein said drop zone extends from one side of said defined volume towards said lift zone and includes a second means for conveying a plurality of mass elements from their positions of relatively higher potential energy towards their positions of relatively low potential energy over said defined drop zone; and said second electro-mechanical device is connected to said mass elements via said second conveyor means and energized to energized by said mass elements being conveyed within said drop zone to a position of lower potential energy.

\* \* \* \* \*

UNITED STATES PATENT AND TRADEMARK OFFICE
CERTIFICATE OF CORRECTION

| | | |
|---|---|---|
| PATENT NO. | : 7,973,420 B2 | Page 1 of 1 |
| APPLICATION NO. | : 12/386865 | |
| DATED | : July 5, 2011 | |
| INVENTOR(S) | : Tom Scott | |

It is certified that error appears in the above-identified patent and that said Letters Patent is hereby corrected as shown below:

Column 8, Line 31, Claim 12:

After "and energized"
Delete "to energized"

Signed and Sealed this
Eighth Day of November, 2011

David J. Kappos
*Director of the United States Patent and Trademark Office*